United States Patent
Macdonald et al.

(10) Patent No.: US 11,749,851 B2
(45) Date of Patent: Sep. 5, 2023

(54) THERMAL REGULATION OF BATTERIES

(71) Applicant: Hamilton Sundstrand Corporation, Charlotte, NC (US)

(72) Inventors: Malcolm Macdonald, West Hartford, CT (US); Charles E. Lents, Amston, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 833 days.

(21) Appl. No.: 16/449,146

(22) Filed: Jun. 21, 2019

(65) Prior Publication Data
US 2020/0303789 A1 Sep. 24, 2020

Related U.S. Application Data

(60) Provisional application No. 62/821,297, filed on Mar. 20, 2019.

(51) Int. Cl.
*H01M 10/63* (2014.01)
*H01M 10/613* (2014.01)
(Continued)

(52) U.S. Cl.
CPC .......... *H01M 10/63* (2015.04); *B64D 37/005* (2013.01); *F28F 27/02* (2013.01); *H01M 10/486* (2013.01);
(Continued)

(58) Field of Classification Search
CPC .. H01M 10/63; H01M 10/613; H01M 10/625; H01M 10/6561; H01M 10/486; B64D 37/005; F28F 27/02
See application file for complete search history.

(56) References Cited

U.S. PATENT DOCUMENTS

| 4,468,440 A | 8/1984 | Evjen |
| 8,047,318 B2 | 11/2011 | Zhu et al. |

(Continued)

FOREIGN PATENT DOCUMENTS

| EP | 2273088 A1 | 1/2011 |
| EP | 2903076 A1 | 8/2015 |

(Continued)

OTHER PUBLICATIONS

Extended European Search Report dated Feb. 1, 2021, issued during the prosecution of European Patent Application No. EP 20181246.8, 13 pages.

(Continued)

*Primary Examiner* — Karie O'Neill Apicella
(74) *Attorney, Agent, or Firm* — Locke Lord LLP; Scott D. Wofsy; Alicia J. Carroll

(57) ABSTRACT

A battery thermal management system for an air vehicle includes a first heat exchange circuit, a battery in thermal communication with the first heat exchange circuit, and a heat exchanger positioned on the first heat exchange circuit. The heat exchanger is operatively connected to a second heat exchange circuit. The system includes a controller operatively connected to the second heat exchange circuit. The controller is configured to variably select whether heat will be rejected to the second heat exchange circuit. A method for controlling a thermal management system for an air vehicle includes determining an expected fluid temperature of fluid in a fluid heat exchange circuit. The method includes commanding a flow restrictor at least partially closed or commanding the flow restrictor at least partially open.

14 Claims, 3 Drawing Sheets

(51) Int. Cl.
*H01M 10/625* (2014.01)
*H01M 10/6561* (2014.01)
*B64D 37/00* (2006.01)
*F28F 27/02* (2006.01)
*H01M 10/48* (2006.01)

(52) U.S. Cl.
CPC ....... *H01M 10/613* (2015.04); *H01M 10/625* (2015.04); *H01M 10/6561* (2015.04); *F28F 2250/06* (2013.01); *H01M 2220/20* (2013.01)

(56) References Cited

U.S. PATENT DOCUMENTS

| | | | |
|---|---|---|---|
| 9,016,080 | B2 | 4/2015 | Brodie et al. |
| 9,583,801 | B2 | 2/2017 | Steinmeyer et al. |
| 9,623,719 | B2 | 4/2017 | Hatakeyama et al. |
| 9,701,215 | B1 | 7/2017 | Kim |
| 10,096,869 | B2 | 10/2018 | Zheng et al. |
| 10,128,544 | B2 | 11/2018 | Cutright et al. |
| 10,150,570 | B2 | 12/2018 | Joubert et al. |
| 2012/0085512 | A1* | 4/2012 | Graaf .................. H01M 10/663 165/51 |
| 2016/0023532 | A1* | 1/2016 | Gauthier .......... H01M 10/6568 62/502 |
| 2016/0144731 | A1 | 5/2016 | Park |
| 2018/0304765 | A1 | 10/2018 | Newman et al. |
| 2019/0020078 | A1 | 1/2019 | Brinkmann et al. |

FOREIGN PATENT DOCUMENTS

| | | | |
|---|---|---|---|
| GN | 206961980 | U | 2/2018 |
| JP | 2012238571 | A | 12/2012 |
| JP | 2015085699 | A | 5/2015 |
| KR | 20120133872 | A | 12/2012 |
| KR | 101807494 | B1 * | 12/2017 .......... H01M 10/613 |

OTHER PUBLICATIONS

Extended European Search Report dated Sep. 8, 2020, issued during the prosecution of European Patent Application No. EP 20163920.0.
Partial European Search Report dated Oct. 15, 2020, issued during the prosecution of European Patent Application No. EP 20181246.8.

* cited by examiner

THERMAL REGULATION OF BATTERIES

CROSS-REFERENCE TO RELATED APPLICATIONS

This application claims benefit of priority to U.S. Provisional Patent Application No. 62/821,297 filed Mar. 20, 2019, which is incorporated by reference herein in its entirety.

STATEMENT REGARDING FEDERALLY SPONSORED RESEARCH OR DEVELOPMENT

This invention was made with government support under contract number NNC14CA32C awarded by the National Aeronautics and Space Administration. The government has certain rights in the invention.

BACKGROUND

1. Field

The present disclosure relates to thermal management and more particularly to thermal management for aircraft batteries.

2. Description of Related Art

Aircraft batteries need thermal management to avoid damage due to overheating and overcooling. Future aircraft may use batteries to feed motors for electric or hybrid-electric propulsion, airfoil stall margin management, and other applications. Thermal management of battery banks is required in order to avoid overheating batteries resulting in premature aging that reduces their storage capacity with repeated cycles ("capacity fade"). In addition, some battery chemistries may suffer from thermal runaway at elevated temperature leading to damage of the batteries and potentially of surrounding equipment. Similarly, in most situations, batteries should not be over-cooled, as their ability to charge and discharge is affected due to reduced rates of diffusion.

The ambient air used for cooling on aircraft is referred to as ram air. Outside (ram) air on hot days at low altitude may be too hot to cool batteries, and at high altitude the air temperature may be too low and would freeze the batteries. The conventional techniques have been considered satisfactory for their intended purpose. However, there is an ever present need for improved thermal management for batteries. This disclosure provides a solution for this need.

SUMMARY

A battery thermal management system for an air vehicle includes a first heat exchange circuit, a battery in thermal communication with the first heat exchange circuit, and a heat exchanger positioned on the first heat exchange circuit. The heat exchanger is operatively connected to a second heat exchange circuit. The system includes a controller operatively connected to the second heat exchange circuit. The controller is configured and adapted to variably select whether heat will be rejected to the second heat exchange circuit.

The system can include a first bypass circuit branching from the first heat exchange circuit upstream from the heat exchanger and reconnecting to the first heat exchange circuit downstream from the heat exchanger and/or a second bypass circuit extending from the second heat exchange circuit upstream of the heat exchanger and reconnecting to an outlet side of the second heat exchange circuit downstream from the heat exchanger. The second heat exchange circuit can be in fluid communication with a ram air source. The system can include a temperature sensor upstream from the heat exchanger positioned to measure a total air temperature of air of the second heat exchange circuit. The controller can be operatively connected to the temperature sensor to receive the total air temperature therefrom. The system can include a first flow restrictor positioned in the first heat exchange circuit upstream from the heat exchanger and/or a second flow restrictor operatively connected to the second heat exchange circuit upstream from the heat exchanger. The system can include a mass flow rate sensor downstream from the second flow restrictor operatively connected to the second heat exchange circuit.

The controller can be operatively connected to the first flow restrictor and/or second flow restrictor. If an expected air temperature of fluid (e.g. air) in the second heat exchange circuit exceeds a pre-determined maximum threshold and/or is below a pre-determined minimum threshold, the controller can be configured and adapted to command the first flow restrictor and/or the second flow restrictor at least partially closed. If an expected fluid temperature of fluid in the second heat exchange circuit is at or below a pre-determined maximum threshold or is at or above a pre-determined minimum threshold, the controller can be configured and adapted to command the first flow restrictor and/or the second flow restrictor at least partially open.

A bypass circuit can extend from the second heat exchange circuit upstream of the heat exchanger and reconnecting to an outlet side of the second heat exchange circuit downstream from the heat exchanger. When the second flow restrictor is at least partially closed on the second heat exchange circuit, fluid flow can be diverted to the bypass circuit. The bypass circuit can include a bypass flow restrictor. When the second flow restrictor is at least partially closed on the second heat exchange circuit, the controller can be configured and adapted to command the bypass flow restrictor at least partially open. When the second flow restrictor is at least partially open on the second heat exchange circuit, the controller can be configured and adapted to command the bypass flow restrictor at least partially closed. The system can include a pump operatively connected to the first heat exchange circuit.

A bypass circuit can extend from the first heat exchange circuit upstream of the heat exchanger and can reconnect to an outlet side of the first heat exchange circuit downstream from the heat exchanger. When the first flow restrictor is at least partially closed on the first heat exchange circuit, fluid flow can be diverted to the first bypass circuit. When the first flow restrictor is at least partially closed on the first heat exchange circuit, the controller can be configured and adapted to command the bypass flow restrictor at least partially open. When the first flow restrictor is at least partially open on the first heat exchange circuit, the controller can be configured and adapted to command the bypass flow restrictor at least partially closed.

In accordance with another aspect, a method for controlling a thermal management system for an air vehicle includes determining an expected fluid temperature of fluid in a fluid heat exchange circuit. The method includes (a) commanding a flow restrictor at least partially closed if the expected fluid temperature (i) exceeds a pre-determined maximum threshold and/or (ii) is below a pre-determined minimum threshold, or (b) commanding the flow restrictor at least partially open if the expected fluid temperature is at or above the pre-determined minimum threshold and/or is at or below the pre-determined maximum threshold. The flow restrictor can be positioned on the fluid heat exchange circuit or a coolant heat exchange circuit.

Determining the expected fluid temperature can include measuring a total air temperature of air of the fluid heat exchange circuit with a temperature sensor upstream from a heat exchanger. Measuring the total air temperature of air of the fluid heat exchange circuit upstream from the heat exchanger can include measuring a total air temperature of air entering an air scoop. The method can include cooling a battery with the air in the fluid heat exchange circuit if the flow restrictor is at least partially open on the fluid heat exchange circuit. The flow restrictor can be a first flow restrictor positioned on the fluid heat exchange circuit and the coolant heat exchange circuit can include a coolant flow restrictor positioned on the coolant heat exchange circuit. The method can include commanding a bypass flow restrictor on a bypass circuit at least partially open when the flow restrictor is at least partially closed. The bypass flow restrictor can be a coolant bypass flow restrictor on a coolant bypass circuit or a bypass flow restrictor on a bypass circuit branching from the fluid heat exchange circuit. The method can include measuring a mass flow rate of air in the fluid heat exchange circuit downstream from the flow restrictor.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
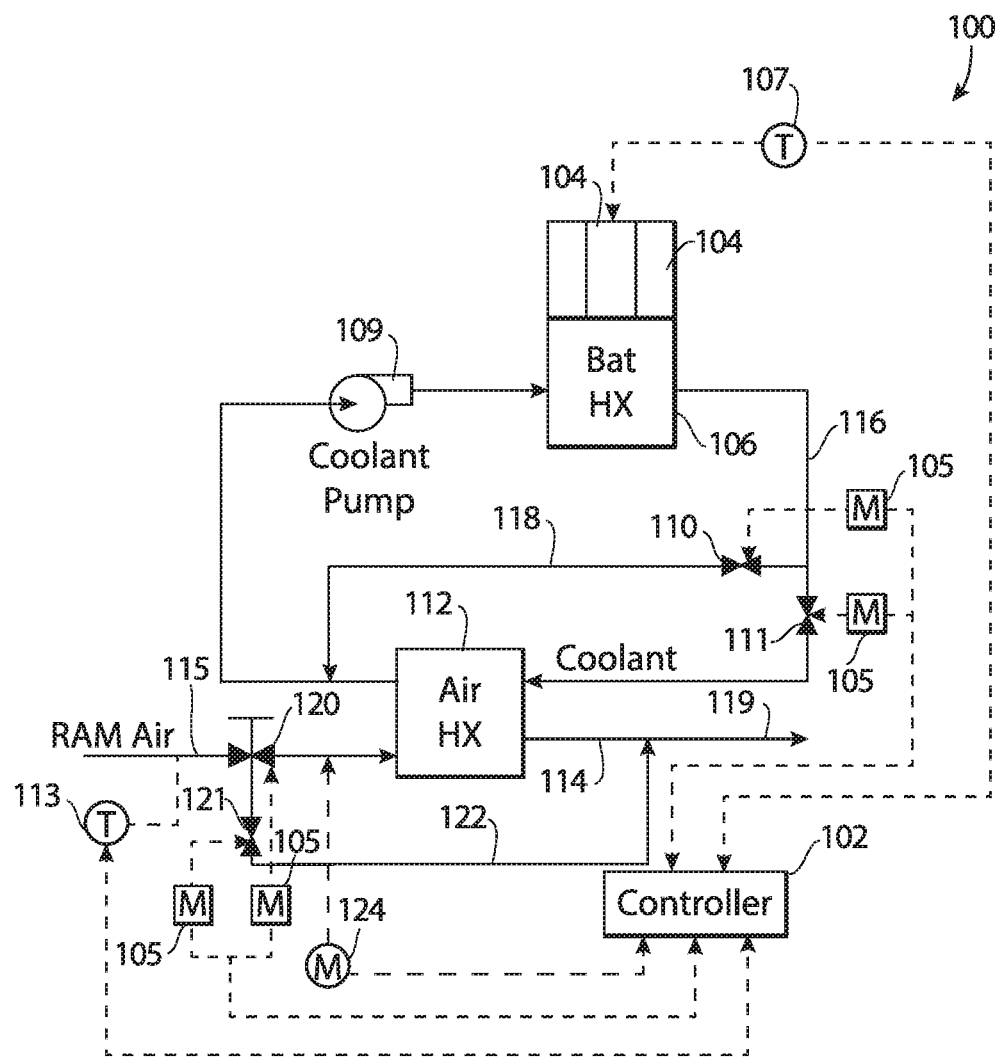
FIG. 1 is a schematic representation of an exemplary embodiment of a battery thermal management system constructed in accordance with the present disclosure, showing the battery operatively connected to a battery heat exchanger.

Reference will now be made to the drawings wherein like reference numerals identify similar structural features or aspects of the subject disclosure. For purposes of explanation and illustration, and not limitation, a schematic view of an exemplary embodiment of the battery thermal management system in accordance with the disclosure is shown in FIG. 1 and is designated generally by reference character 100. Other embodiments of the battery thermal management system in accordance with the disclosure, or aspects thereof, are provided in FIGS. 2-3 as will be described. The systems and methods described herein can be used to pre-cool idle batteries and cool batteries during charge/discharge in order to avoid overheating and capacity fade for batteries in hybrid-electric propulsion, all-electric propulsion, airfoil stall margin management, and other applications.

As shown in FIG. 1, a battery thermal management system 100 for an air vehicle includes a controller 102, a first heat exchange circuit 116, e.g. a coolant heat exchange circuit, a second heat exchange circuit 114, e.g. a gas or air heat exchange circuit, and a heat exchanger 112, e.g. an air heat exchanger, or coolant-air heat exchanger. The heat exchanger 112 is positioned on the coolant heat exchange circuit 116 and the gas heat exchange circuit 114. A bank of batteries 104 are in thermal communication with the coolant heat exchange circuit 116. Signals to and from the controller 102, indicated schematically by solid and/or dashed lines extending therefrom, can be routed to and from dedicated ports on the controller 102, or the sensors and actuators (described below) can be networked together with each device having its own address. In some embodiments, the components may communicate with the controller via a standard communication protocol involving the transfer of digital information. The controller 102 is operatively connected (by way of flow restrictor 120) to the gas heat exchange circuit 114. Those skilled in the art will readily appreciate that, while certain inputs/outputs are shown, the controller could include a variety of other inputs/outputs.

With continued reference to FIG. 1, the system 100 includes a bypass circuit 122 extending from the gas heat exchange circuit 114 upstream of the heat exchanger 112 and reconnecting to an outlet side of the gas heat exchange circuit 114 downstream from the heat exchanger 112. The gas heat exchange circuit 114 can be in fluid communication with a ram air source/inlet 115. The system can include a temperature sensor 113 operatively connected to the gas heat exchange circuit 114 upstream from the heat exchanger 112 positioned to measure a total air temperature of air of the gas heat exchange circuit 114. The controller 102 is operatively connected to the temperature sensor 113 to receive the total air temperature therefrom. The system 100 also includes a temperature sensor 107 connected to one or more batteries 104. The system 100 includes a flow restrictor, e.g. a valve 120, operatively connected to the gas heat exchange circuit 114 upstream from the heat exchanger 112. The system includes a bypass flow restrictor, e.g. valve 121, operatively connected to bypass circuit 122. In some embodiments, flow restrictors 120 and 121 are combined into a single three-way valve at the position where 120 presently is placed. The system 100 includes a mass flow rate sensor 124 downstream from the flow restrictor 120. The controller 102 is configured and adapted to variably select whether air from ram air inlet 115 will flow through gas heat exchange circuit 114 such that heat from coolant heat exchange circuit 116 can be rejected thereto.

With continued reference to FIG. 1, it is contemplated that instead of, or in addition to, bypass circuit 122, system 100 includes a first bypass circuit 118, e.g. a coolant bypass circuit, or the like, branching from the coolant heat exchange circuit 116 upstream from the heat exchanger 112 and reconnecting to the coolant heat exchange circuit 116 downstream from the coolant-air heat exchanger 112. The system 100 includes a bypass circuit flow restrictor 110, e.g. bypass circuit valve 110, positioned on the bypass circuit 118 and a bypass flow restrictor 111, e.g. coolant bypass valve 111, positioned on coolant heat exchange circuit 116. Controller 102 is operatively connected to bypass circuit valve 110 and bypass valve 111. Bypass circuit valve 110 and coolant bypass valve 111 include respective motors 105 in operative communication with controller 102 to receive open/close commands therefrom. In some embodiments, valves 110 and 111 can be combined into a three-way valve that directs flow either to coolant-air heat exchanger 112 or to bypass circuit

118. Bypass circuit 118 assists in diverting around the coolant-air heat exchanger 112 to avoid heating the fluid during conditions where the total air temperature of ram air is greater than the maximum battery temperature operating limit or cooling the fluid when the total air temperature of the ram air is less than the minimum battery temperature operating limit.

With continued reference to FIG. 1, if an expected air temperature of air in the gas heat exchange circuit 114 exceeds a pre-determined maximum threshold and/or is below a pre-determined minimum threshold, the controller 102 is configured and adapted to command valve 110 at least partially open and valve 111 to at least partially closed (e.g. by way of their respective motors 105). If an expected air temperature of air in the gas heat exchange circuit 114 is at or below a pre-determined maximum threshold or is at or above a pre-determined minimum threshold, the controller 102 is configured and adapted to command valve 110 at least partially closed and coolant bypass valve 111 at least partially opened (e.g. by way of their respective motors 105). When coolant bypass valve 111 is at least partially closed on the gas heat exchange circuit 114, coolant (fluid) flow can be diverted to the bypass circuit 118. The reverse command can be executed once the total air temperature lowers below the pre-determined maximum threshold and/or is above the pre-determined minimum threshold. When the flow restrictor 110 is at least partially closed on the coolant heat exchange circuit, the controller is configured and adapted to command the bypass circuit flow restrictor 110, e.g. bypass circuit valve 110, at least partially open, for example, fully open. When the coolant bypass valve 111 is at least partially open on the coolant heat exchange circuit 116, the controller is configured and adapted to command the bypass circuit flow restrictor 110 at least partially closed, for example, fully closed. The bypass commands for flow restrictors 110 and 111 can accompany the commands that open or close flow restrictors 120 and 121 or can be independent thereof. Valves 110 and/or 111 can be a gate valve, a globe valve, a needle valve, or any other proportional valve.

As shown in FIG. 1, controller 102 is operatively connected to flow restrictor 120 and bypass flow restrictor 121. If an expected air temperature of air in the gas heat exchange circuit 114 exceeds a pre-determined maximum threshold and/or is below a pre-determined minimum threshold, the controller 102 is configured and adapted to command the flow restrictor 120 at least partially close on the gas heat exchange circuit 114. If an expected air temperature of air in the gas heat exchange circuit 114 is at or below a pre-determined maximum threshold or is at or above a pre-determined minimum threshold, the controller 102 is configured and adapted to command the flow restrictor 120 at least partially open on the gas heat exchange circuit 114. When the flow restrictor 120 is at least partially closed on the gas heat exchange circuit 114, air flow can be diverted to the bypass circuit 122. When the flow restrictor 120 is at least partially closed on the gas heat exchange circuit, the controller is configured and adapted to command the bypass flow restrictor 121, e.g. bypass valve 121, at least partially open. When the flow restrictor 120 is at least partially open on the gas heat exchange circuit 114, the controller is configured and adapted to command the bypass flow restrictor 121 closed.

With continued reference to FIG. 1, a heat transfer fluid, e.g. a coolant, circulates through coolant heat exchange circuit 116 to transfer heat between batteries 104 and the coolant. Those skilled in the art that the coolant (e.g. heat transfer fluid) in circuit 116 can also be a two-phase fluid (e.g. liquid and gas). The system 100 includes a battery heat exchanger 106 positioned on the coolant heat exchange circuit 116 in thermal communication with the bank of batteries 104. The coolant-air heat exchanger 112 is positioned on the air heat exchange circuit 114 in fluid communication with ram air inlet 115. Ram air is air outside of the fuselage of an aircraft. While the heat sink for air heat exchange circuit 114 is described herein as ram air, those skilled in the art will readily appreciate that heat exchange circuit 114 can be operatively connected to other ducts to receive fan duct bypass air, cabin outflow air, conditioned air from an environmental control system, or the like. The bank of batteries 104 are in thermal communication with the coolant heat exchange circuit 116 by way of the battery heat exchanger 106. For example, these can be reserve batteries that are inoperative during cruise, or batteries of a hybrid electric aircraft propulsion system where the batteries and electric motors assist with takeoff and climb, but are inoperative during cruise. The batteries 104 could be positioned in a variety of positions throughout the aircraft, for example, in the wings (e.g. in wing roots). In some embodiments, batteries 104 can furnish energy to a propulsion system for propulsion power or for transient operation (e.g. to avoid stall) or for other applications. The system 100 assists in avoiding battery overheating and damage during charging and discharging due to internal resistances. Those skilled in the art will readily appreciate that referring to "battery temperature," "battery heat load" or other singular reference to battery, could mean the temperature/heat load of an individual battery 104 or group of batteries 104.

With continued reference to FIG. 1, system includes a coolant pump 109 upstream from the battery heat exchanger 106. Pump 109 is fluidically connected to the coolant heat exchange circuit 116 to circulate heat transfer fluid to heat or cool the batteries 104 downstream. The heat transfer fluid can be any of a number of fluids, including but not limited to water and other aqueous fluids, as well as polar and non-polar organic fluids. In some embodiments, the heat transfer fluid (coolant) can be in liquid form, but can also be in gaseous form as well as including gas or liquid form such as in a vapor compression heat transfer loop. Examples of heat transfer fluids include but are not limited to glycols such as ethylene glycol or propylene glycol, alcohols such as methanol or ethanol, water and aqueous solutions such as heat transfer brines, and other organic fluids such as propane, butane, and substituted hydrocarbons (e.g., fluoro-substituted) and other organic compounds such as 2,2,3,3-tetrafluoropropene or 1,1,1,2-tetrafluoroethane. Flight-critical components of a propulsion system 100, such as a coolant circulation pump 109, may be present in duplicate on an aircraft for redundancy. Moreover, it is contemplated that more than two pumps 109 can be used in system 100. Those skilled in the art will readily appreciate that pump 109 can be a centrifugal pump, reciprocating pump, screw pump, diaphragm pump, or any other suitable mechanical pump. A respective motor (not shown) can be operatively connected to the coolant pump 109 to drive the coolant pump 109. In general, the batteries 104 reject heat to the air heat exchange circuit 114 by way of the coolant heat exchange circuit 116. In some embodiments, the coolant-air heat exchanger 112 can be sized to reject waste heat generated by the batteries 104 in full at a particular altitude, which is associated with temperature and pressure of the air heat sink (ram air). Below that altitude, only part of the heat generated by the batteries may be rejected. Above that altitude, not only the heat load from battery operation, but also the stored thermal energy can be rejected. Thermal energy storage allows excess thermal energy to be stored and used hours, days, or months later. Operation of system 100 is controlled by controller 102 at various altitudes, as described in more detail below.

With continued reference to FIG. 1, bypass valve 121 and valve 120 can include respective motors 105 in operative communication with controller 102 to receive open/close commands therefrom. In some embodiments, valves 120 and 121 or valves 110 and 111 can be combined into a three-way valve that directs flow either to coolant-air-heat exchanger 112 or to one of the bypass circuits 122 and 118. Bypass circuit 122 assists in diverting ram air around the coolant-air heat exchanger 112 to avoid over-heating or over-cooling the fluid during conditions where the total air temperature of ram air is greater or less than a given temperature range. If the total air temperature of the ram air is above a pre-determined maximum total air temperature threshold, the controller 102 operates to command valve 121 open and valve 120 close (either fully or partially). Motors 105 receive a command from controller and, in turn, operate to open or close their respective valves 120 or 121. The reverse command can be executed if the total air temperature below a pre-determined minimum total air temperature threshold. Valves 120 and/or 121 can be a gate valve, a globe valve, a needle valve, or any other proportional valve.

With continued reference to FIG. 1, the coolant-air heat exchanger 112 is positioned on the coolant heat exchange circuit 116 and the gas heat exchange circuit 114 to exchange heat therebetween. The system 100 includes a temperature sensor 113 operatively connected to a point upstream from the coolant-air heat exchanger 112 to measure a total air temperature of air entering via ram air inlet 115. In some embodiments, the total air temperature may be reported to controller 102 from another source on the aircraft such as an air data computer which may be in operative communication with a thermometer that measure total air temperature. Gas heat exchange circuit 114 can also include a fan or the like for conditions where the aircraft is idle, e.g. on ground. In the systems and embodiments of the present invention, the flow of air through ram air inlet 115 can be curtailed or eliminated during hot conditions, e.g. when the total air temperature is above a pre-determined total air temperature threshold, by closing the ram air door 115 either partially or fully (instead of closing valve 120). In embodiments where several heat exchangers share a common ram air inlet 115, the air heat exchange circuit 114 may be optionally outfitted with an air splitter (not shown) to branch the flow of ram air to individual heat exchangers. In this case, further flow restrictors can be located upstream of coolant-air heat exchanger 112 to restrict or allow flow as needed. Those skilled in the art will readily appreciate that, in some embodiments, fluid in the heat exchange circuit 114 can vent outside of the aircraft at outlet 119 after going through the coolant-air heat exchanger 112.

In some embodiments, if the total air temperature of the ram air is low enough, e.g. if the stagnation temperature of the ram air ($T_{ra}$) heat sink is less than the battery temperature ($T_B$) plus a delta T ($\Delta T$), the controller 102 keeps valves 120 and/or coolant bypass valve 111 at least partially open to their respective circuits 114 and 116 so that coolant heat exchange circuit 116 (and, in turn, batteries 104) may be cooled with ram air. In other words, when $T_{ra}<(T_B+\Delta T)$, then cooling the coolant heat exchange circuit 116 that is in thermal communication with the batteries 104 (by way of heat exchanger 106) using the ram air can be initiated or continued. Delta T ($\Delta T$) is to ensure that there is enough of a temperature difference between $T_{ra}$ and $T_B$ ensure good heat transfer and to accommodate any heat generated from operation of pump 109. Delta T can be 5-10° C. (41-50° F.), for example. In some embodiments, aircraft may encounter a condition wherein heat rejection from batteries 104 continues during cruise in excess of battery heat loads. In other words, instead of just maintaining a battery temperature during periods of time when the batteries 104 are generating heat, such as charging or discharging, the batteries 104 can be cooled such that the temperature reduces while the batteries 104 are charging/discharging, or the batteries 104 can be cooled while the batteries 104 are idle (e.g. not charging/discharging). As a result, the batteries are cooled overall (for example to 5° C.). This is desirable because the charging process causes the batteries to heat up, and this gives an option to pre-cool them to reduce the cooling load later on.

In some embodiments, if an expected battery temperature exceeds a pre-determined threshold, and the total air temperature measured at sensor 113 is below a predetermined ram air threshold, it may be desired to pre-cool the batteries 104 by way of coolant heat exchange circuit 116 (which can be cooled with ram air by way of circuit 114) to avoid overheating when thermal loads are imposed. Battery temperature is a function of several variables including battery mass, battery heat capacity, initial battery temperature, heat sink temperature, and thermal loads. The expected battery temperature can be predicted (calculated) from the heat loads, the specific heat of the battery (which can be characterized), the mass of the battery, and the initial battery temperature. Alternatively, the expected battery temperature can be predicted from empirical battery operating data to simplify the control of the thermal management system. Those skilled in the art will readily appreciate that the expected temperature of a battery 104 (or group of batteries 104) can be calculated in real time or a look-up table can be used. Pre-cooling is a form of thermal storage in which heat has been removed and the lower temperature battery reflects the absence of heat. For example, on a hot day, aircraft batteries can be pre-cooled prior to takeoff in order to avoid high temperatures during discharging.

It is also contemplated that pre-cooling be done during flight for anticipated charging on the ground. In this embodiment, if $T_{ra}<(T_B+\Delta T)$, controller 102 is configured and adapted to command valve 120 and/or valve 111 open in order to pre-cool the batteries 104 to a temperature below a maximum battery temperature prior to the batteries 104 being charged or discharged. For example, at a cruise altitude prior to landing, valve 120 and/or valve 111 is opened to pre-cool the batteries 104 prior to landing where it is expected that the batteries 104 will need to be recharged. It is also contemplated that batteries may be recharged in flight and the available ram air through ram air inlet 115 can be used as a heat sink via air heat exchange circuit 114. This tends to allow the batteries 104 to take advantage of the excess power that engines typically have during cruise when they are no longer accelerating, thin air, and due to fuel weight loss. Batteries 104 can be charged during cruise to take advantage of the available power combined with the available heat sink, e.g. ram air. Moreover, if $T_{ra}$ becomes too low to utilize as a heat sink and would freeze the batteries, e.g. if $T_{ra}<(T_{B\ MIN})$, where $T_{B\ MIN}$ is a minimum battery temperature, controller 102 is configured and adapted to close flow restrictor 120, e.g. valve 120, and/or flow restrictor 111, and have the ram air bypass the air-coolant heat exchanger 112 via gas bypass circuit 122 and/or have the coolant bypass the air-coolant heat exchanger 112 via coolant bypass circuit 118.

Figure 2:
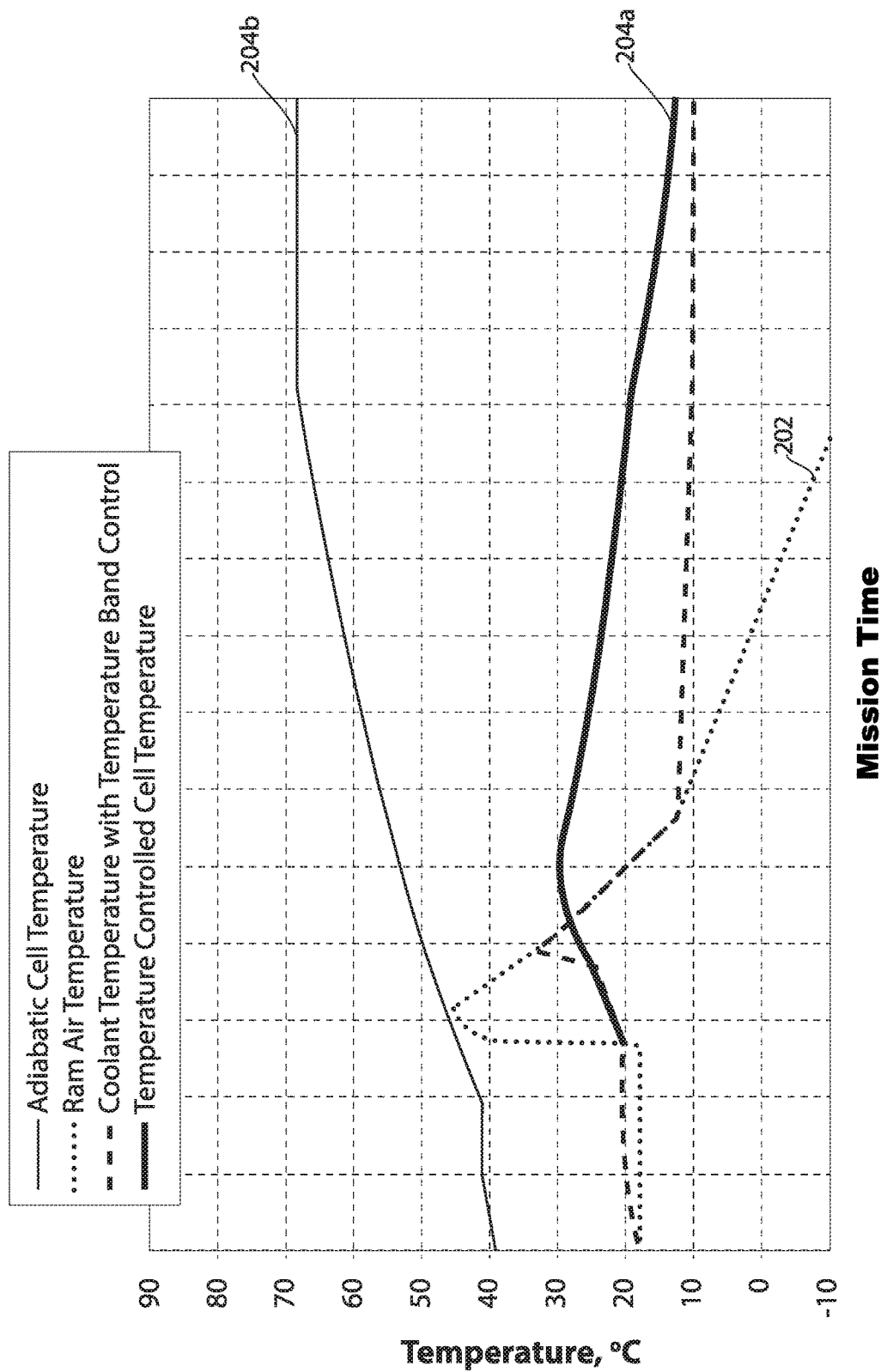
FIG. 2 is a plot representing temperature versus mission time, showing battery temperature with and without cooling.
Figure 3:
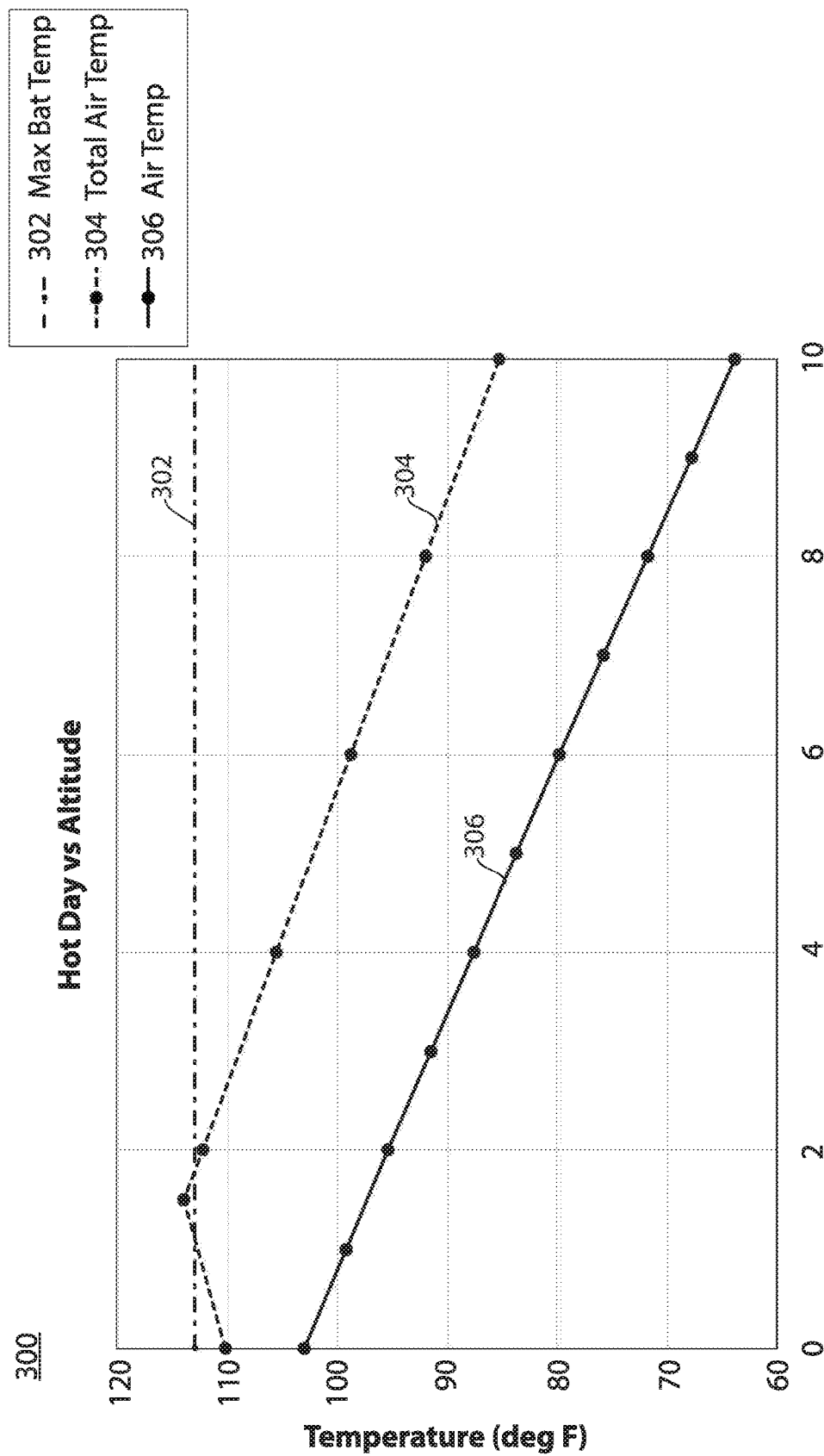
FIG. 3 is a plot representing temperature versus altitude, showing a maximum battery temperature.

As shown in FIG. 3, in some embodiments, system 100 is used on a hot day to provide cooling during charging/discharging or pre-cooling before any charging/discharging. On a hot day, at low altitude and high velocity, the total air temperature of the ram air, represented by line 304 may exceed the desired maximum battery temperature, represented by line 302, e.g. 113° F. or 45° C. As the altitude increases, the total air temperature and the air temperature of the atmospheric air will decrease. Line 306 represents the ambient air temperature. As shown in FIG. 1, the controller 102 is configured and adapted to close valve 120 and/or valve 111 if a total air temperature of air entering inlet 115 is greater than a desired battery temperature or actual battery temperature (e.g. if $T_{ra} > (T_B + \Delta T)$). In this case, because $T_{ra} > (T_B + \Delta T)$ at low altitudes, controller 102 will command flow restrictor 120 and/or flow restrictor 111 to close and will allow the temperature in the batteries 104 to rise, also described below with respect to FIG. 2. Once $T_{ra} < (T_B + \Delta T)$, controller 102 (e.g. between an altitude of 5,000-10,000 feet) controller 102 will command flow restrictor 120 and/or flow restrictor 111 to open (if not already open) to begin to remove heat from batteries 104 via air heat exchange circuit 114 and coolant heat exchange circuit 116. Once the desired (or minimum) $T_B$ is reached, coolant-air heat exchanger 112 can be bypassed via bypass circuit 122, and/or bypass circuit 118, to avoid further heat exchange between circuit 116 and circuit 114. Those skilled in the art will readily appreciate that the temperatures shown herein may vary depending on battery chemistry, weather, time of day, or the like. The pre-determined threshold for the battery temperature, described above, can be set based on the maximum battery temperature for a given battery chemistry.

A method for controlling a thermal management system, e.g. system 100, for an air vehicle includes determining an expected temperature of fluid (e.g. air) in a fluid heat exchange circuit, e.g. second/air heat exchange circuit 114. The method includes commanding a flow restrictor, e.g. flow restrictor 120 and/or flow restrictor 111, at least partially closed on the air heat exchange circuit if the expected fluid temperature (i) exceeds a pre-determined maximum threshold and/or (ii) is below a pre-determined minimum threshold, or commanding the flow restrictor at least partially open on the fluid heat exchange circuit if the expected fluid temperature is at or above the pre-determined minimum threshold and/or is at or below the pre-determined maximum threshold. The pre-determined maximum threshold can be set by a desired battery temperature or actual battery temperature plus a delta temperature. The pre-determined minimum threshold can be set by a minimum battery temperature, $T_{B\ MIN}$.

With continued reference to FIG. 1, determining the expected fluid temperature includes measuring a total air temperature of air of the fluid heat exchange circuit with a temperature sensor, e.g. temperature sensor 113, upstream from a heat exchanger, e.g. coolant-air heat exchanger 112. Measuring the total air temperature of air of the fluid heat exchange circuit upstream from the heat exchanger can include measuring a total air temperature of air entering a ram air inlet, e.g. ram air inlet 115. The method can include cooling a battery, e.g. battery 104, with the air in the fluid heat exchange circuit (by way of coolant heat exchange circuit 116) if the flow restrictor is at least partially open on the fluid heat exchange circuit. The method can include commanding a bypass flow restrictor, e.g. bypass flow restrictor 121 and/or bypass circuit flow restrictor 110, on a bypass circuit, e.g. bypass circuit 122 and/or bypass circuit 118, at least partially open when the corresponding flow restrictor is at least partially closed on the gas heat exchange circuit. The method includes measuring a mass flow rate of air in the gas heat exchange circuit downstream from the flow restrictor.

In accordance with some embodiments, the ability to reject heat to an on-ground heat sink like ram air, may not be available. Accordingly, a method for controlling a thermal management system, e.g. system 100, for an air vehicle includes determining an expected temperature of batteries, e.g. batteries 104, and charging and/or discharging the batteries without pre-cooling or cooling if the expected temperature of the batteries does not exceed a pre-determined temperature threshold. In one embodiment, the stagnation temperature of ram air for an aircraft at low altitude on a hot day (40° C.) during takeoff, climb out, and initial climb, may be higher than the maximum desired battery temperature, so cooling with ram air may not be desired. In this case, the batteries are allowed to heat up optionally with monitoring by a temperature sensor, e.g. sensor 107, in operative communication with a controller, e.g. controller 102. In other words, if the expected temperature of the batteries during charge or discharge is not expected to rise above its maximum temperature, pre-cooling or cooling during discharge may not be required. Allowing the batteries to heat up in some cases (e.g. using batteries for thermal storage) avoids the need to size a heat exchanger to reject battery heat to surrounding air on a hot day on the ground, which tends to reduce the size of the heat exchanger needed.

As shown in FIG. 3, where the total ram air temperature, indicated schematically by line 304, exceeds a battery temperature, the batteries, e.g. batteries 104, are allowed to heat up by way of charge or discharge and then are cooled once the ram air temperature decreases. In other words, the method can include closing valve 120 with the controller.

This cooling can be pre-cooling and can be used where a scenario like that of FIG. 2 is expected. Line 202 represents a ram air temperature and line 204b represents the battery temperature at a adiabatic state (e.g. if there were not any cooling at all). By pre-cooling and starting from approximately 20° C. (68° F.), as indicated by line 204a, battery overheating can be prevented without having to cool the batteries during the actual charge/discharge. After discharge, and/or once the aircraft reaches an altitude where the total air temperature is lower than the battery temperature, the method includes opening valve 120 and/or valve 111 and turning the air heat exchange circuit 114 and/or coolant heat exchange circuit 116, "ON" by the controller, during, before, or after charge or discharge, when a heat sink, e.g. cooling ram air, is readily available. For example, at an altitude between 5,000 and 10,000 ft, the ambient air is sufficiently cool even on a hot day, as defined by MIL-STD-210C, to serve a heat sink for rejected heat from the batteries.

At the altitude at which the cooling system is actuated, the batteries may still continue to store some heat as well as reject some to the air heat exchange circuit, e.g. air heat exchange circuit 114. An aircraft may encounter a condition wherein heat rejection from batteries continues during cruise in excess of battery heat loads. As a result, in this embodiment, the method includes cooling the batteries (e.g. to 5° C.) at a higher altitude with air heat exchange circuit 114. This is desirable because the charging process causes the batteries to heat up, and pre-cooling them helps reduce the cooling load. Moreover, for an aircraft application, the power required for climb steadily diminishes until cruising altitude is reached due in part to the reduced drag in thinner atmosphere. As a result, an aircraft that derives propulsive energy from batteries, e.g. batteries 104, during climb will experience steadily decreasing heat loads. The decreases in battery heat load and in ambient temperature both facilitate battery-cooling.

The methods and systems of the present disclosure, as described above and shown in the drawings, provide for thermal battery control with superior properties including smaller heat exchangers, increased battery cycle life, avoiding overheating and capacity fade, avoiding thermal runaway and avoiding battery freezing. The regulation of the air circuit and the ram air inlet allows for reduced drag and increased aircraft efficiency. The systems and methods of the present invention can apply to automotive batteries, aircraft batteries, terrestrial batteries, or the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A battery thermal management system for an air vehicle comprising:
   a first heat exchange circuit;
   a battery in thermal communication with the first heat exchange circuit;
   a heat exchanger positioned on the first heat exchange circuit, wherein the heat exchanger is operatively connected to a second air heat exchange circuit in fluid communication with a ram air source;
   a bypass circuit branching from the second air heat exchange circuit upstream from the heat exchanger and reconnecting to an outlet side of the second air heat exchange circuit downstream from the heat exchanger; and
   a controller operatively connected to the second air heat exchange circuit, wherein the controller is configured and adapted to variably select whether heat will be rejected to the second air heat exchange circuit.

2. The system as recited in claim 1, wherein the bypass circuit is a second bypass circuit, the system further comprising a first bypass circuit extending from the first heat exchange circuit upstream of the heat exchanger and reconnecting to the first heat exchange circuit downstream from the heat exchanger.

3. The system as recited in claim 1, further comprising a temperature sensor upstream from the heat exchanger positioned to measure a total air temperature of air of the air second heat exchange circuit.

4. The system as recited in claim 3, wherein the controller is operatively connected to the temperature sensor to receive the total air temperature therefrom.

5. The system as recited in claim 1, further comprising at least one of (i) a first flow restrictor positioned in the first heat exchange circuit upstream from the heat exchanger, and/or (ii) a second flow restrictor operatively connected to the second air heat exchange circuit upstream from the heat exchanger.

6. The system as recited in claim 5, further comprising a mass flow rate sensor downstream from the second flow restrictor operatively connected to the second air heat exchange circuit.

7. The system as recited in claim 5, wherein the controller is operatively connected to at least one of the first flow restrictor and/or the second flow restrictor, wherein if an expected fluid temperature of air in the second air heat exchange circuit at least one of (i) exceeds a pre-determined maximum threshold and/or (ii) is below a pre-determined minimum threshold, the controller is configured and adapted to command at least one of the first flow restrictor and/or the second flow restrictor at least partially closed.

8. The system as recited in claim 5, wherein the controller is operatively connected to at least one of the first flow restrictor and/or the second restrictor, wherein if an expected fluid temperature of air in the second air heat exchange circuit at or below a pre-determined maximum threshold or is at or above a pre-determined minimum threshold, the controller is configured and adapted to command at least one of the first flow restrictor and/or the second flow restrictor at least partially open.

9. The system as recited in claim 5, wherein, when the second flow restrictor is at least partially closed on the second air heat exchange circuit, fluid flow is diverted to the bypass circuit.

10. The system as recited in claim 9, wherein the bypass circuit includes a bypass flow restrictor, wherein, when the second flow restrictor is at least partially closed on the second air heat exchange circuit, the controller is configured and adapted to command the bypass flow restrictor at least partially open.

11. The system as recited in claim 9, wherein the bypass circuit includes a bypass flow restrictor, wherein, when the second flow restrictor is at least partially open on the second air heat exchange circuit, the controller is configured and adapted to command the bypass flow restrictor at least partially closed.

12. The system as recited in claim 5, wherein, when the first flow restrictor is at least partially closed on the first heat exchange circuit, fluid flow is diverted to the bypass circuit.

13. The system as recited in claim 12, wherein the bypass circuit includes a bypass flow restrictor, wherein, when the first flow restrictor is at least partially closed on the first heat exchange circuit, the controller is configured and adapted to command the bypass flow restrictor at least partially open.

14. The system as recited in claim 12, wherein the bypass circuit includes a bypass flow restrictor, wherein, when the first flow restrictor is at least partially open on the first heat exchange circuit, the controller is configured and adapted to command the bypass flow restrictor at least partially closed.

* * * * *